(12) United States Patent
Weedlun et al.

(10) Patent No.: US 10,611,133 B2
(45) Date of Patent: *Apr. 7, 2020

(54) PROCESS FOR CREATING A SUBLIMATED PRINTED HEAT-SEALABLE APPLIQUE

(71) Applicant: Lion Brothers Company, Inc., Owings Mills, MD (US)

(72) Inventors: Paul Weedlun, Fulton, MD (US); Patricia A. Mason, White Hall, MD (US); Gillian Ross, Ellicott City, MD (US); Owen McGovern, Columbia, MD (US)

(73) Assignee: Lion Brothers Company, Inc., Owings Mills, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,003

(22) Filed: Mar. 9, 2018

(65) Prior Publication Data

US 2018/0345640 A1 Dec. 6, 2018

Related U.S. Application Data

(63) Continuation of application No. 15/592,142, filed on May 10, 2017, now Pat. No. 10,252,502.

(Continued)

(51) Int. Cl.
*B32B 3/02* (2006.01)
*B32B 27/40* (2006.01)
(Continued)

(52) U.S. Cl.
CPC .............. *B32B 27/40* (2013.01); *B32B 5/022* (2013.01); *B32B 5/024* (2013.01); *B32B 5/026* (2013.01);
(Continued)

(58) Field of Classification Search
CPC ... B32B 7/12; B32B 5/022; B32B 5/024; B32B 27/36; B32B 27/40; B32B 37/12
See application file for complete search history.

(56) References Cited

U.S. PATENT DOCUMENTS 9,701,153 B2 * 7/2017 Chiao .................... B44C 1/1756
2011/0070409 A1 * 3/2011 Nishimaki .............. B32B 27/40
428/190

(Continued)

*Primary Examiner* — Elizabeth E Mulvaney
(74) *Attorney, Agent, or Firm* — Royal W. Craig; Gordon Feinblatt LLC

(57) ABSTRACT

A process for producing a colorfast thermal appliqué using a polyester knit fabric blank, dye-sublimation printing a graphic image on the fabric blank, and laminating a triple-layer polyurethane adhesive on another side of the printed fabric blank. The triple-layer adhesive comprises a first layer of clear ink resistant polyurethane adhesive followed by a white-pigmented ink resistant polyurethane adhesive and a third clear layer of ink-resistant polyurethane adhesive. The first layer of the triple-layer adhesive is fused under combined temperature and pressure to the polyester blank until said first and second layers impregnates into said fabric blank. The fabric blank is then cut into a discrete finished appliqué that does not substantially change the physical and visual characteristics of a performance fabric substrate to which the appliqué is applied.

27 Claims, 2 Drawing Sheets

Related U.S. Application Data

(60) Provisional application No. 62/469,903, filed on Mar. 10, 2017.

(51) Int. Cl.
| | |
|---|---|
| *B32B 7/12* | (2006.01) |
| *B32B 5/02* | (2006.01) |
| *B32B 37/12* | (2006.01) |
| *B32B 38/00* | (2006.01) |
| *B32B 37/08* | (2006.01) |
| *B32B 27/36* | (2006.01) |
| *B41M 3/12* | (2006.01) |
| *D06P 5/28* | (2006.01) |

(52) U.S. Cl.
CPC ............... *B32B 7/12* (2013.01); *B32B 27/36* (2013.01); *B32B 37/08* (2013.01); *B32B 37/12* (2013.01); *B32B 38/145* (2013.01); *B41M 3/12* (2013.01); *B32B 2307/4026* (2013.01); *B32B 2307/41* (2013.01); *D06P 5/004* (2013.01)

(56) References Cited

U.S. PATENT DOCUMENTS

| | | | | |
|---|---|---|---|---|
| 2011/0289647 | A1* | 12/2011 | Chiao | B32B 7/12 2/69 |
| 2012/0225242 | A1* | 9/2012 | Liang | B32B 37/12 428/86 |
| 2015/0197113 | A1* | 7/2015 | Lee | B41M 5/504 442/181 |
| 2016/0174638 | A1* | 6/2016 | Kwon | A41D 27/08 428/353 |

\* cited by examiner

PROCESS FOR CREATING A SUBLIMATED PRINTED HEAT-SEALABLE APPLIQUE

CROSS-REFERENCE TO RELATED APPLICATIONS

The present application derives priority from U.S. Provisional Patent Application 62/469,903 filed 10 Mar. 2017 and is a continuation of U.S. application Ser. No. 15/592,142 filed 10 May 2017.

BACKGROUND OF THE INVENTION

1. Field of the Invention

The present invention relates to the creation of heat activated transfers and appliqué and, particularly, to a heat-transfer comprised of numbers, letters, logos, graphics, and other indicia that retains graphical integrity by inhibiting migration of ink and/or dye from the transfer or to the transfer from the garment fabric below.

2. Description of the Background

Often "performance garments" are comprised of polyester fabrics that are color-dyed using a sublimation process. The dye sublimation process uses high heat to permanently fuse the colorant into the polyester fabric. For heat setting dye sublimation inks into polyester materials, temperatures in the range of 400° F. (204° C.) with dwell times of approximately 1 minute are typically required. The heat serves two critical functions: first it causes the pores of the polyester fabric to open up, so the material can accept the dye; and second, the heat converts the solid ink dye into a gas for diffusion into the fabric.

Manufacturers of performance apparel, uniforms, swimwear, and sports accessories also use various methods to apply a variety of indicia, such as text, numbers, logos, graphics, and other indicia, to garments and textiles for decoration and identification, among other things. Common application technologies include silk-screening, screen-printing, and sublimated fabric heat activated transfers.

Silk-screening of logos or emblems is commonly used, but this process does not result in a product that withstands repeated stretching, and is complex and time-consuming. In addition, the designs created by silk-screening are flat, lack texture, and do not withstand repeated stretching or industrial or home washings. Consequently, many companies prefer sublimated printed fabric appliqués as their primary method for applying decoration and identification.

Thermally activated adhesive coatings are also used to apply appliqué to garments and textiles. One common type of appliqué, typical of sports jersey and uniform numbering and lettering, is a layered appliqué comprising a solid first base layer that defines a numeral or letter and one or more top layers that are the same shape, but smaller than the layer below it, thereby creating a three dimensional appearance. Typically, each layer is made from dyed fabrics and each additional top layer is stitched to the layer below it. On the back of the solid base layer is a layer of thermally activated adhesive that covers the entire back surface. If the appliqué is heat-pressed onto an underlying substrate that was pre-colored using dye sublimation the heat can release the dye, causing migration into the appliqué and discoloration. The thermally activated adhesive can also have filler that can provide opacity to prevent the garment material color showing though the decoration.

An issue that can arise through die use of an opaque adhesive is the appearance of an opaque adhesive edge left visible along the edge of the decoration. Often this visual glue edge is undesirable and causes the appearance of the decoration to be objectionable. It would be greatly advantageous to provide a light weight heat sealed sublimated printed appliqué that can be applied to any garment or textile without having a loss of graphic caused by dye migration from the appliqué or from the underlying material it is heat applied to. It would also be beneficial if the visual adhesive edge was minimized, to improve overall appliqué appearance whilst providing suitable opacity to prevent show through of the garment material.

SUMMARY OF THE INVENTION

It is, therefore, an object of the present invention to provide a heat sealed appliqué forming indicia such as text, numbers, logos, graphics, and other indicia that does not under normal conditions of use degrade graphically.

It is another object of the present invention to provide a heat sealed appliqué that prevents show-through of the underlying garment patterns and prevents migration of dyes from the garment fabric to the appliqué.

It is another object of the invention to prevent the migration of the sublimation dyes from the graphic into the backing beneath to avoid color loss or fading.

It is another object of the present invention to provide a heat sealed appliqué that prevents visual adhesive edges around the appliqué through the process of adhesion to the garment.

It is yet another object of the present invention to provide a heat sealed appliqué that resembles a traditional layered appliqué often used for lettering and numbering on sports jerseys and uniforms.

And it is another object of the present invention to provide a heat sealed appliqué that can be manufactured cost effectively.

According to the present invention, the above-described and other objects are accomplished, by an appliqué comprising a particular woven, nonwoven or knit structure, of polyester fiber composition and cut, the fabric having a thermally activated adhesive coating on one side using multilayer ink resistant polyurethanes or other appropriate thermoplastic adhesive that could be polyester, polyolefin or polyaramid based. The preferred embodiment adhesive coating consists of a clear ink-resistant thermoplastic with a melting range between 60-180 deg. C., which is laminated to a second layer of white pigmented ink-resistant thermoplastic having a melting range between 80-210 degrees C. Laminated to the second layer is a third clear layer of ink resistant thermoplastic with a melting range between 60-180 degrees C., and this third layer is used as the adhesive for securing the appliqué to other products. The appliqué is die-cut or laser-cut from a sheet or roll to a discrete predetermined indicia (text, number, logo, graphic, etc.).

Such an appliqué is manufactured by printing a graphic on to the appliqué base material. The three layer adhesive is then fused under a temperature and pressure condition required to activate and flow the third layer of adhesive into the printed appliqué media. The printed and laminated material is then cut through using lasers or other mechanical cutting means. The product can then be utilized to decorate apparel or other products by adhering the appliqué on using the clear adhesive layer. This layer is activated at a lower heat and pressure than during lamination of the adhesive to the printed layer.

The result is a decorated garment or item utilizing a polyester fiber material surface with a printed graphic. The choice of at least two dissimilar ink-resistant thermoplastic adhesives in a three layer construction with 1) a clear lower-melt point bonding layer reserved to bond to the appliqué; 2) a pigmented layer used for opacity and as an additional ink migration barrier processed under conditions appropriate to its use and function, and 3) a third clear layer reserved for the purpose of heat-sealing to the apparel or other type of product, which helps maintain the integrity of the printed graphs by inhibiting migration of inks or dyes in either direction, in conjunction with providing required opacity to prevent show through of garment color and reduced visual edge of the opaque adhesive material. In summary an appliqué with superior visual appearance.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

The present invention is a process for producing a heat-activated appliqué that retains graphical integrity by inhibiting migration of ink or dye from the transfer or through the transfer from the garment fabric below. The opaque adhesive also prevents show through of the garment fabric whilst providing minimal visual opaque adhesive at the edge of the appliqué. The heat-activated appliqué itself comprises a graphic printed onto the appliqué material with a three layer heat activated adhesive.

Figure 1:
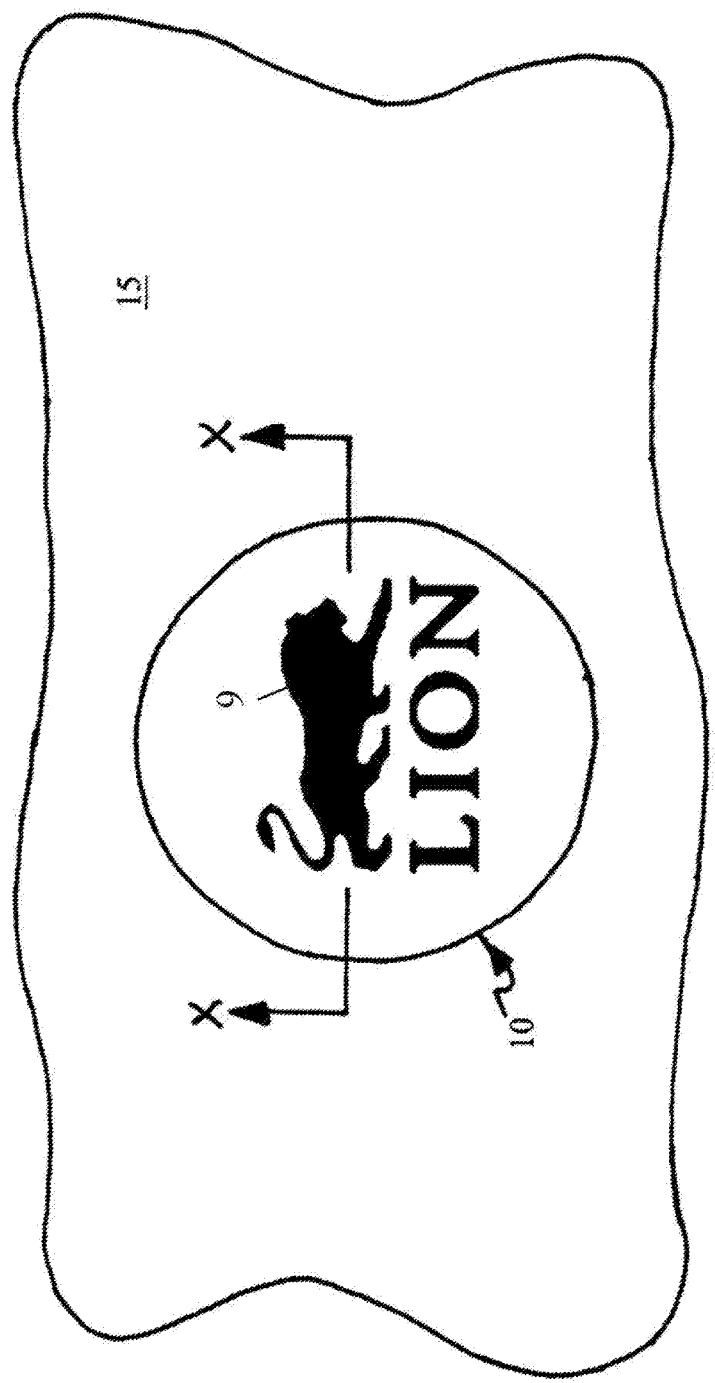
FIG. 1 is a top view of an appliqué emblem 10 according to the present invention as applied to apparel.
Figure 2:
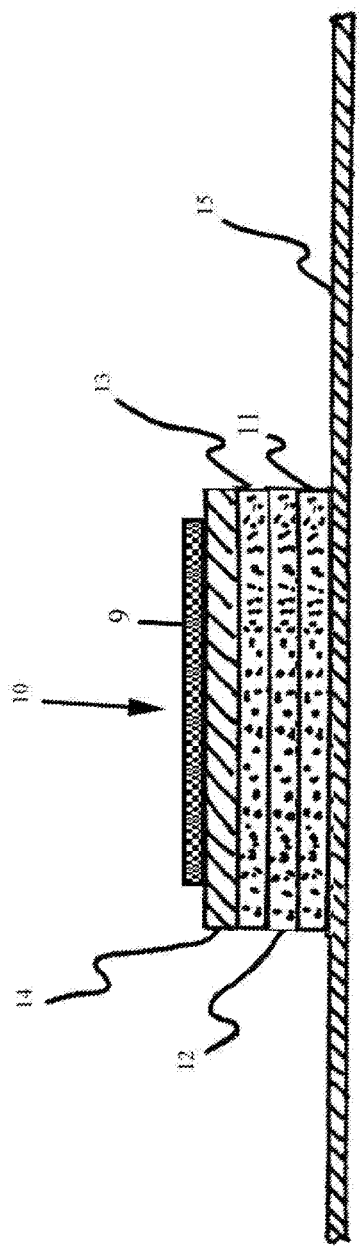
FIG. 2 is a cross-sectional view of an embodiment of the present invention taken at line x-x of FIG. 1.

With combined reference to FIGS. 1 and 2, the heat activated appliqué 10 of the present invention includes triple heat-activated adhesive layers 11, 12, 13 and an upper appliqué fabric layer 14 atop the lower triple adhesive layers 11, 12, 13. The lower heat activated adhesive layer 11 bonds the appliqué 10 to a substrate 15, which may be any fabric or leather substrate. A graphic image 9 is printed atop the fabric layer 14. The graphic 9 may be any decorative image or shape including alpha-numeric characters, logos or images. The graphic 9 can be printed atop the fabric layer 14 by sublimation printing in which a dye is heat transferred into the surface of the fabric layer. The triple adhesive layers 11, 12, 13 collectively inhibit migration of sublimation ink, and or ink or dye to the substrate 15.

In a preferred embodiment the middle adhesive layer 12 comprises a layer of white pigmented ink-resistant thermoplastic adhesive such as polyurethane having a melting point in the range between 80-210 degrees C. The white pigment in middle adhesive layer 12 may be any of titanium dioxide, antimony oxide, zinc oxide, magnesium silicate (talc), calcium sulfate, barium sulfate, zinc borate, anhydrous sodium potassium alumina silicate, and calcium carbonate, or other pigmenting agents. Both the upper and lower adhesive layers 11, 13 comprise a clear layer of ink resistant polyurethane with a melting point within the range between 60-160 degrees C. The lower adhesive layer 11 is used as the adhesive for securing the appliqué 10 to substrate 15 or other products, while the upper adhesive layer 13 is reserved for securing the fabric layer 14. The middle adhesive layer 12 serves to provide a white opaque layer, the white pigment layer forms a light reflecting layer of suspended insoluble particles with no migration tendency themselves. The thermoplastic in this layer has good resistance to ink migration through it, and high temperature and UV resistance. All three adhesive layers 11, 12, 13 provide a robust migration barrier that inhibits migration of ink or dyes to the substrate 15, or vice versa.

The appliqué 10 is well-suited for application to any fabric or leather substrate 15, including coarser non-woven fabrics such as felt and fleece ("substrate" being herein defined as any leather or fabric, whether woven fabric or non-woven fabric, or any other flexible material used for apparel, signage, banners, pennants or similar, and "non-woven" being herein defined as any fabric substrate produced by processes other than weaving).

Figure 3:
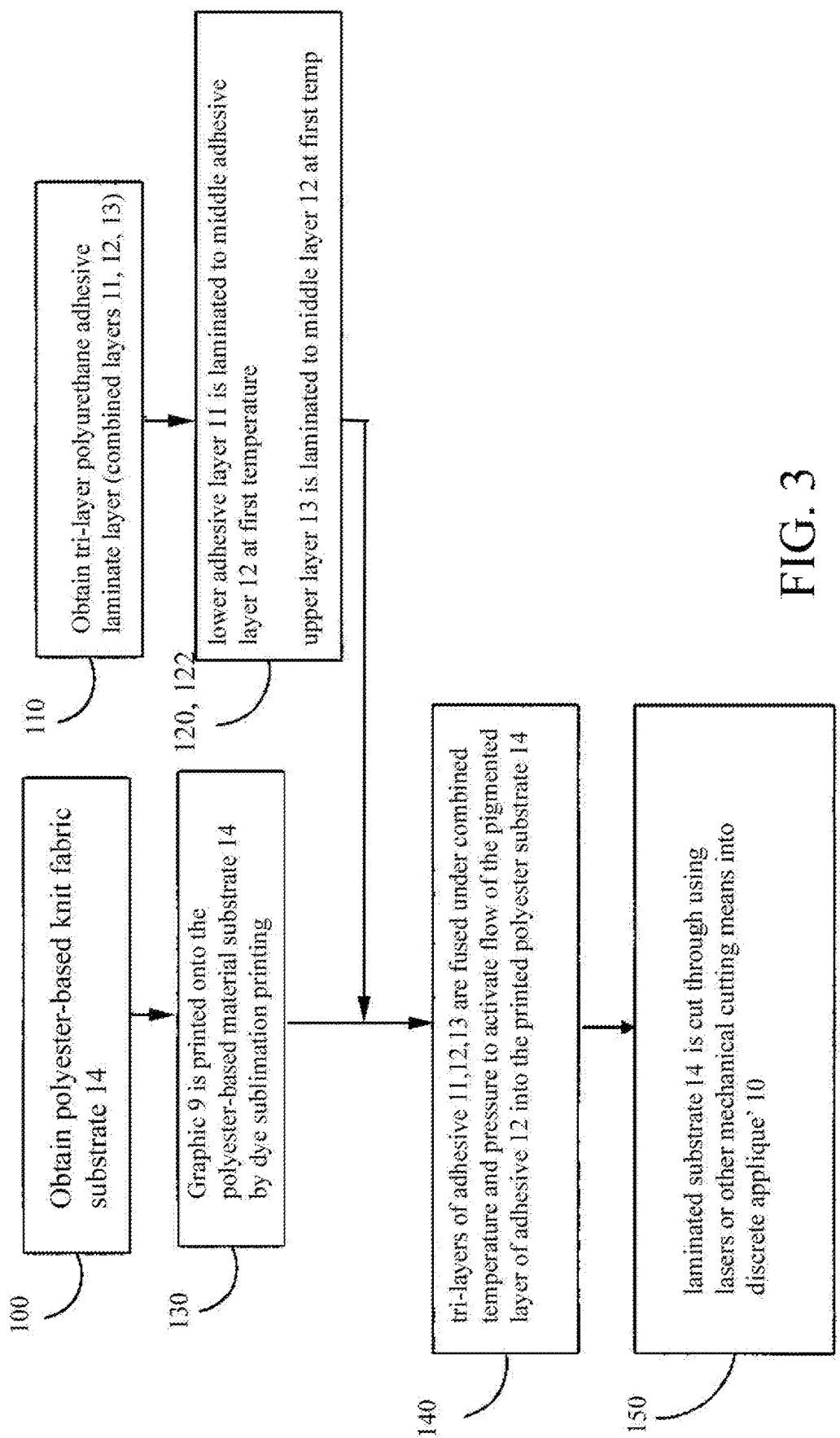
FIG. 3 is a process diagram of the process for creating the appliqué 10 of FIGS. 1-2.

FIG. 3 is a process diagram of the process for creating the appliqué 10 of FIGS. 1-2.

The process begins by obtaining the components therefor at step 100 a polyester fabric blank; and at step 110 a triple-layer polyurethane adhesive laminate layer (combined layers 11, 12, 13). As seen in step 110, the triple-layer polyurethane adhesive laminate is preferably created in advance for ready-made application to the appliqué material 1. One skilled in the art will readily understand that the separate layers 11, 12, 13 may be individually-applied to substrate 15 with the same result, but is more efficient and economical to pre-produce the triple-layer polyurethane adhesive laminate in advance for ready-made application to the appliqué material 1. Pre-production of triple-layer polyurethane adhesive laminate layer (combined layers 11, 12, 13) is accomplished as follows:

At step 120 a lower adhesive layer 11 of clear ink resistant polyurethane is laminated to the white middle adhesive layer 12 at a first temperature preferably within a range of from 60° C. to 160° C., and at step 122 (which may be performed simultaneously) an upper adhesive layer 13 of clear ink resistant polyurethane is laminated to middle adhesive layer 12 at said first temperature. Both upper and lower adhesive layers 11, 13 have a melting range of 60-160 degrees C., and the first temperature is within that range and sufficient to melt the lower and upper adhesive layers 11, 13. This will fuse them to the middle adhesive layer 12, but the temperature is below the melting range of the white middle adhesive layer 12 which melts at a temperature higher than the other adhesive layers. This lower adhesive layer 11 is used as the adhesive for securing the appliqué 10 to substrate 15 or other products, while the upper adhesive layer 13 is reserved for securement to fabric 14. This step 120 effectively forms the composite triple-layer polyurethane adhesive laminate, that it may be sandwiched between sheets of release paper for later use. Upon cooling the result of step 120 is a triple-layer polyurethane adhesive laminate layer comprising combined layers 11, 12 and 13.

Referring back to the substrate 14, at step 130 a graphic 9 is printed onto one side of the appliqué material 14.

At step 140 the triple-layer polyurethane adhesive laminate produced in step 120 including all layers of adhesive 11, 12, 13 are fused to the printed substrate 14. Upper layer 13 is fused directly to the non-printed side of substrate 14 under a combined temperature and pressure condition sufficient to activate and flow the clear upper layer of adhesive 13 into the appliqué material 14.

At step 150 the now-printed and laminated substrate 14 is cut through using lasers or other mechanical cutting means into a discrete appliqué 10. The appliqué 10 can then be utilized to decorate, apparel or other products, by adhering the appliqué 10 using the clear adhesive layer 11 which is activated at a lower heat and pressure than required to melt flow the middle white layer adhesive 12.

The result is a decorated appliqué 10 utilizing an appliqué material 14 with a printed graphic 9. The choice of at least two dissimilar ink-resistant polyurethane adhesives arranged in three layers 11, 12, 13, two such layers 11, 13 being clear and one 11 being reserved for the purpose of heat-sealing to the apparel substrate 15, plus one pigmented layer 12 there between helps maintain the integrity of the printed graphs by inhibiting migration of inks or dyes in either direction. The decorated appliqué 10 may be processed under conditions appropriate to its use and function. The migration resistance was measured in both wet and dry conditions as per AATCC163 (Colorfastness-Die transfer in storage) and provided a ΔE<0.5 on average across the range of sublimation colors ROYGBIV. Previous adhesives used in this space can be <0.7 ΔE. The new adhesive formulation also provides a means of application with reduced visual adhesive edge, whilst still providing the required opacity to prevent garment color show through. The adhesive edge was measured on average to be <0.2 mm. Adhesives with required opacity used prior to this development could have an adhesive edge as high as 0.4 mm.

It should now be apparent that the foregoing results in a color-printed and/highlighted appliqué 10 as in FIGS. 1-2 that gives an aesthetically-pleasing embossed or otherwise color-contrasted appearance in a form that is easily applied to a garment or other textile.

We claim:

1. A process for producing a thermal appliqué, comprising the steps of:
   obtaining a fabric blank comprising a woven or non-woven material;
   obtaining a stratified thermal adhesive laminate comprising a layer of pigmented ink resistant thermoplastic adhesive disposed between opposing layers of clear thermoplastic adhesive;
   fusing said stratified thermal adhesive laminate on one side to said fabric blank under combined temperature and pressure until it impregnates into said fabric blank; and
   cutting said fabric blank into a discrete appliqué.

2. The process for producing a thermal appliqué according to claim 1, wherein said step of obtaining said fabric blank comprises obtaining said fabric blank having a graphic image printed on one side of said fabric blank.

3. The process for producing a thermal appliqué according to claim 1, wherein said layer of pigmented ink resistant thermoplastic adhesive has a melting point higher than both said layers of clear thermoplastic adhesive.

4. The process for producing a thermal appliqué according to claim 3, wherein said layer of pigmented ink resistant thermoplastic adhesive has a melting point within a range of between 80-210 degrees C.

5. The process for producing a thermal appliqué according to claim 4, wherein said opposing layers of clear thermoplastic adhesive both have the same melting point.

6. The process for producing a thermal appliqué according to claim 5, wherein said opposing layers of clear thermoplastic adhesive have the same melting point within the range between 60-160 degrees C.

7. The process for producing a thermal appliqué according to claim 1, wherein said pigmented ink resistant thermoplastic adhesive layer comprises white pigment chosen from among a group consisting of titanium dioxide, antimony oxide, zinc oxide, magnesium silicate (talc), calcium sulfite, barium sulfate, zinc borate, anhydrous sodium potassium alumina silicate, and calcium carbonate.

8. The process for producing a thermal appliqué according to claim 1, wherein said layer of pigmented ink resistant thermoplastic adhesive layer forms an ink-migration blocking layer.

9. A process for producing a thermal adhesive laminate for use with a thermal appliqué, comprising the steps of:
   obtaining a layer of thermoplastic adhesive containing a pigment and having a first melting point; and
   overlaying said layer of pigmented thermoplastic adhesive on both sides with clear thermoplastic adhesive at a temperature less than said first temperature.

10. A process for producing a thermal appliqué using the thermoplastic adhesive laminate of claim 9, comprising the steps of:
    obtaining a fabric blank comprising a woven or non-woven polyester knit;
    printing a graphic image on one side of said fabric blank;
    fusing said thermoplastic adhesive laminate to said fabric blank under combined temperature and pressure until it impregnates into said fabric blank; and
    cutting said fabric blank into a discrete appliqué.

11. A stratified thermal adhesive laminate for use in conjunction with a thermal appliqué, comprising:
    a layer of thermoplastic adhesive containing a pigment;
    a layer of clear thermoplastic adhesive on one side of said layer of pigmented thermoplastic adhesive; and
    a layer of clear thermoplastic adhesive on another side of said layer of pigmented thermoplastic adhesive;
    wherein said layers of clear thermoplastic adhesive have a lower melting point than said layer of pigmented thermoplastic adhesive.

12. The stratified thermal adhesive laminate according to claim 11, wherein said layer of pigmented thermoplastic adhesive has a melting point within a range of between 80-210 degrees C.

13. The stratified to thermal adhesive laminate according to claim 11, wherein both of said layers of clear thermoplastic adhesive have melting points within the range of between 60-160 degrees C.

14. The stratified thermal adhesive laminate according to claim 10, wherein said layer of pigmented ink resistant thermoplastic adhesive comprises a white pigment chosen from among a group consisting of titanium dioxide, antimony erode, zinc oxide, magnesium silicate (talc), calcium sulfate, barium sulfate, zinc borate, anhydrous sodium potassium alumina silicate, and calcium carbonate.

15. The stratified thermal adhesive laminate according to claim 11, wherein said layer of pigmented ink resistant thermoplastic adhesive forms an ink-migration blocking layer.

16. A thermal appliqué, comprising:
    a fabric patch comprising a woven or non-woven polyester knit having a graphic image on one side of said fabric patch; and
    the stratified thermal adhesive laminate of claim 11 fused to one side of said fabric patch.

17. The stratified thermal adhesive laminate according to claim 16, wherein said layer of pigmented ink resistant thermoplastic adhesive forms an opaque layer reducing show through of the underlying material to which the appliqué is applied.

18. The stratified thermal adhesive laminate according to claim 16, wherein said layer of pigmented ink resistant thermoplastic adhesive forms an opaque layer that reduces visual white adhesive edge as a result of heat and pressure application of the appliqué.

19. The stratified thermal adhesive laminate according to claim 16, wherein said layers of thermoplastic are thermoplastic polyurethane.

20. The stratified thermal adhesive laminate according to claim 16, wherein said appliqué material is polyester based.

21. The stratified thermal adhesive laminate according to claim 20, wherein said appliqué is printed using sublimation printing.

22. The process for producing a thermal appliqué according to claim 1, wherein said pigmented ink resistant thermoplastic adhesive comprises a plurality of pigments.

23. The process for producing a thermal appliqué according to claim 22, wherein said pigmented ink resistant thermoplastic adhesive comprises white pigment and black pigment.

24. The process for producing a thermal appliqué according to claim 1, wherein said layer of pigmented ink resistant thermoplastic adhesive comprises a plurality of pigment layers.

25. The process for producing a thermal appliqué according to claim 24, wherein said plurality of pigment layers comprise a white pigment and a black pigment.

26. The process for producing a thermal appliqué according to claim 25, wherein said black pigment comprises one or more of carbon black and activated carbon.

27. A stratified thermal adhesive laminate for use in conjunction with a thermal appliqué, comprising:
    a layer of white thermoplastic adhesive;
    a layer of black thermoplastic adhesive on one side of said layer of white thermoplastic adhesive;
    a first layer of clear thermoplastic adhesive on another side of said layer of white thermoplastic adhesive; and
    a second layer of clear thermoplastic adhesive on one side of said layer of black thermoplastic adhesive;
    wherein said first and second layers of clear thermoplastic adhesive have a lower melting point than said layers of white and black thermoplastic adhesive.

* * * * *